(12) United States Patent
Tsukioka (10) Patent No.: US 7,349,119 B2
(45) Date of Patent: Mar. 25, 2008

(54) IMAGE STORAGE AND CONTROL DEVICE FOR CAMERA TO GENERATE SYNTHESIZED IMAGE WITH WIDE DYNAMIC RANGE

(75) Inventor: Taketo Tsukioka, Hachioji (JP)

(73) Assignee: Olympus Corporation, Tokyo (JP)

( * ) Notice: Subject to any disclaimer, the term of this patent is extended or adjusted under 35 U.S.C. 154(b) by 778 days.

(21) Appl. No.: 10/094,940

(22) Filed: Mar. 11, 2002

(65) Prior Publication Data

US 2002/0154829 A1    Oct. 24, 2002

(30) Foreign Application Priority Data

Mar. 12, 2001    (JP)    .............. 2001-069109

(51) Int. Cl.
G06F 15/00    (2006.01)
(52) U.S. Cl. ................. 358/1.18; 358/1.9; 358/518; 358/520; 358/540; 382/284; 348/234
(58) Field of Classification Search ............... 358/1.18, 358/1.9, 518, 520, 540, 302; 382/284; 348/234
See application file for complete search history.

(56) References Cited

U.S. PATENT DOCUMENTS

| 5,162,914 A | 11/1992 | Takahashi et al. |
| 5,309,243 A | 5/1994 | Tsai |
| 5,420,635 A | 5/1995 | Konishi et al. |
| 5,715,377 A * | 2/1998 | Fukushima et al. ......... 358/1.9 |
| 6,529,640 B1 * | 3/2003 | Utagawa et al. ........... 382/284 |
| 7,098,946 B1 | 8/2006 | Koseki et al. |
| 2003/0133035 A1 | 7/2003 | Hatano |

FOREIGN PATENT DOCUMENTS

| EP | 0 977 432 | 2/2000 |
| JP | 5-7336 | 1/1993 |
| JP | 2000-92378 | 3/2000 |

* cited by examiner

Primary Examiner—Twyler Lamb
Assistant Examiner—Jacky X. Zheng
(74) Attorney, Agent, or Firm—Straub and Pokotylo; John C. Pokotylo

(57) ABSTRACT

The invention is an image pickup apparatus comprising an LE-SE buffer for storing multiple images with different exposure amounts that have been taken with a CCD, an SL synthesizing circuit for performing Super Latitude (SL) processing for the multiple images to generate a synthesized image with a wide dynamic range, a suitability evaluating circuit for evaluating whether the photography scene is suitable for performing SL processing with the SL synthesizing circuit, an image quality evaluating circuit for comparing the synthesized image with the images before synthesizing and evaluating image quality, and a recording format selecting circuit for which of the multiple images before synthesizing and the synthesized image to be recorded by a recording circuit, based on the image quality evaluation results and operating input from a key input circuit.

24 Claims, 8 Drawing Sheets

IMAGE STORAGE AND CONTROL DEVICE FOR CAMERA TO GENERATE SYNTHESIZED IMAGE WITH WIDE DYNAMIC RANGE

This application claims benefit of Japanese Application No. 2001-69109 filed in Japan on Mar. 12, 2001, the contents of which are incorporated by this reference.

BACKGROUND OF THE INVENTION

1. Field of the Invention

The present invention relates to an image pickup apparatus, and more specifically relates to an image pickup apparatus capable of generating, from multiple images with differing exposure amounts, a synthesized image with a wide dynamic range.

2. Description of the Related Art

Various types of apparatuses are known as image pickup apparatuses for electronically taking images of subjects, such as TV cameras, video cameras, electronic cameras, and so forth.

Common image pickup devices such as CCDs or the like used in such image pickup apparatuses have properties in which the dynamic range thereof regarding gradations is narrower than that of silver-salt film used with conventional silver-salt cameras, and accordingly, in the event that an image is taken of subject with great differences in light and dark parts, e.g., in the event that an image is taken in bright sunlight both into the sun and at shadows at the same time, taking the image so that the exposure for one is suitable may result in the other blacking out or whiting out (white scattering).

An image pickup apparatus which synthesizes multiple images with differing exposure amounts and generates one wide dynamic range image so that both the light parts and dark parts are suitably reproduced even with image pickup scenes with a great difference in light and dark parts, performing so-called SL (Super Latitude) processing, has been conventionally proposed.

For example, Japanese Unexamined Patent Application Publication No. 2000-92378 proposes, as such, an image pickup apparatus comprising: image pickup means capable of taking images of the same subject with differing exposure amounts and generating image signals for multiple screens having differing exposure amounts; and means for synthesizing the image signals for multiple screens having differing exposure amounts obtained by the image pickup means and generating a wide-dynamic-range synthesized image; further comprising at least two control means of a normal photography control means according to a normal photography mode for generating one screen of image pickup signals from the image pickup means, forced wide-dynamic-range photography control means according to a forced wide-dynamic-range photography mode for forcibly generating a wide-dynamic-range synthesized image, and automatic wide-dynamic-range photography control means according to an automatic wide-dynamic-range photography mode for automatically and selectively generating a wide-dynamic-range synthesized image based on subject information or photography setting information; and mode setting means for selectively setting one photography mode from the photography modes corresponding to these control means.

Further, the Publication describes further comprising, in addition to the above configuration, suitability judging means for performing judgment regarding whether or not the information obtained as generating processing conditions for generating a wide dynamic range synthesized image is information which matches the generating processing for a wide dynamic range synthesized image, and means for, in the event that the photography mode set by the mode setting means and the judgment results made by the suitability judging means do not match, instructing changing the information parameter settings or photography settings, or instructing a re-take.

Thus, the image pickup apparatus according to the Publication judges the suitability of SL processing from multiple images taken with differing exposures, and in the event that there is no suitability, SL processing is not performed.

Now, the SL processing is a type of image processing, and is not restricted to execution with image pickup apparatuses alone, but can also be performed with other processing devices, such as personal computers for example, or the like.

There are cases wherein, even in the event that sufficient SL processing is difficult to perform due to the computation power, memory capacity, etc., of the image pickup apparatus itself, high-quality SL processing can be performed by using an external processing device or the like having relatively high computational processing capabilities and sufficient memory and the like, as described above.

However, with a conventional example as described above, in the event that the SL processing is cancelled, only a standard exposure image is output, and there is no consideration given to processing with external devices, so such later processing could not be handled.

Also, automatically judging whether or not performing SL processing is suitable is actually difficult to realize, so there are cases wherein, even in the event that judgment is made that SL processing is suitable, the results are unacceptable when viewed by humans. However, with the conventional example, SL processing is performed even in such cases based on the automatic judging results, so images which are subjectively perceived to be deteriorated are forcibly recorded to a recording medium or the like.

Further, with the conventional example, in the event that judgment is made that performing SL processing is not suitable, the user had no way of knowing how to attain a suitable state, so operability was not good by any means.

SUMMARY OF THE INVENTION

It is an object of the present invention to provide an image pickup apparatus capable of performing synthesizing of wide dynamic range images by the image pickup apparatus itself, and also enabling this to be performed by external devices as well.

Briefly, the present invention is an image pickup apparatus, comprising: image pickup means capable of taking a plurality of images with differing amounts of exposure light; synthesizing means for generating a synthesized image with a wide dynamic range from a plurality of images obtained from the image pickup means; selecting means for selecting, from the synthesized image and the plurality of images, images to be recorded and the recording format thereof; and recording means for recording images selected by the selecting means based on the selected recording format.

The above and other objects, features and advantages of the invention will become more clearly understood from the following description referring to the accompanying drawings.

DETAILED DESCRIPTION OF THE PREFERRED EMBODIMENT(S)

The following is a description of embodiments of the present invention, with reference to the drawings.

Figure 1:
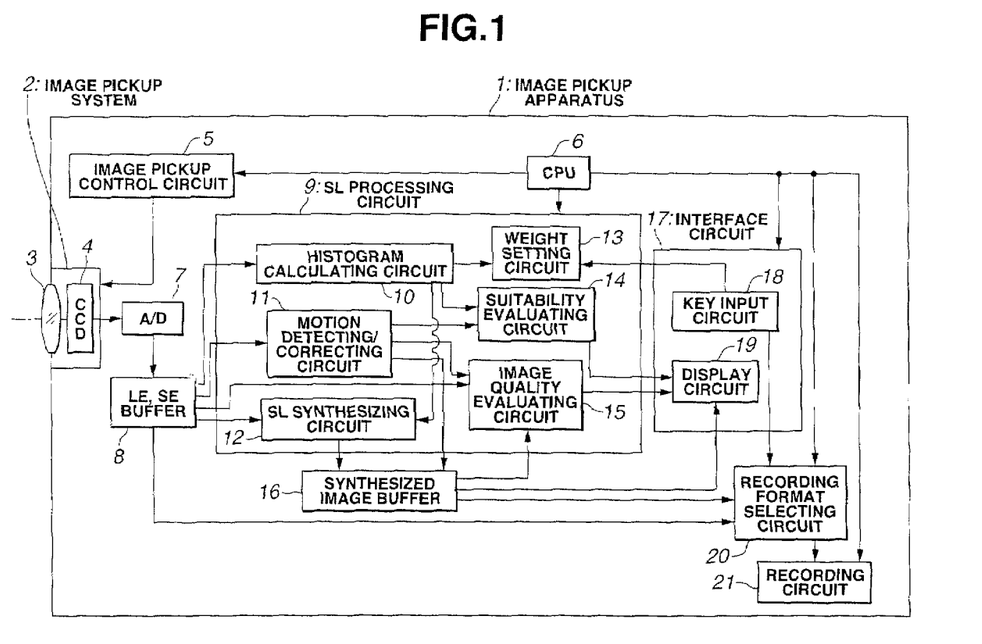
FIG. 1 is a block diagram illustrating the configuration of an image pickup apparatus according to an embodiment of the present invention.

FIG. 1 through FIG. 9 illustrate an embodiment of the present invention, and FIG. 1 is a block diagram illustrating the configuration of the image pickup apparatus.

This image pickup apparatus 1 is configured as an electronic camera, for example, capable of normal photography wherein one image is recorded by one exposure, and also capable of performing wide dynamic range photography. This wide dynamic range photography involves exposing multiple images with differing exposures at almost the same time (consecutively, with short time intervals) of the same subject, and subjecting these images to synthesizing (SL processing), so as to obtain a single wide dynamic range image, and in this case, an image relating to a long exposure (LE), and an image relating to a short exposure (SE) are taken, for example, and these are synthesized.

The image pickup apparatus 1 is configured having an image pickup system 2 comprising a CCD 4 serving as image pickup means which have an electronic shutter function for performing photo-electric conversion of a subject image and outputting as image signals and a lens 3 for imaging the subject image on the CCD 4, an image pickup control circuit 5 for controlling the image pickup operations of this image pickup system 2, an A/D converter 7 for converting analog signals, which have been subjected to removal of noise components with an unshown correlated double sampling circuit or the like following output from the CCD 4 and further amplified, into digital signals, an LE-SE buffer 8 for storing image data relating to long exposure (LE) and image data relating to short exposure (SE) digitized by the A/D converter 7, an SL processing circuit 9 for processing image data relating to the long exposure (LE) and image data relating to short exposure (SE) stored in the LE-SE buffer 8 to generate one wide dynamic range image, a synthesized image buffer 16 for storing the wide dynamic range image created by the SL processing circuit 9, an interface circuit 17 including an input/output circuit to the image pickup apparatus 1, a recording format selecting circuit 20 serving as selecting means for selecting which to record out of the images stored in the above LE-SE buffer 8 and the images stored in the synthesized image buffer 16, a recording circuit 21 serving as recording means for recording images selected by the recording format selecting circuit 20 to a recording medium or the like, and a CPU 6 for centrally controlling the above-described circuits.

The SL processing circuit 9 is configured having a histogram calculating circuit 10 for calculating histograms based on luminance signals or the edges or the like of luminance signals contained in the image signals output from the LE-SE buffer 8, a motion detecting/correcting circuit 11 serving as motion detecting means for performing detection of movement within a screen and performing correction necessary for synthesizing at a later stage, by obtaining the difference between the long exposure (LE) exposure image and short exposure (SE) image taken with the time difference that are stored in the LE-SE buffer 8, a weight setting circuit 13 for setting weight at the time of calculating a tone curve for the gradation correction properties based on the histogram calculated by the histogram calculating circuit 10 and input settings from a later-described key input circuit 18, a suitability evaluating circuit 14 serving as suitability evaluating means for evaluating whether or not a photography scene is suitable for performing SL processing based on calculation results made by the histogram calculating circuit 10 and the detection results of the motion detecting/correcting circuit 11, unsuitable region extracting means thereof, correction difficulty evaluating means, unsuitability cause detecting means, and exposure evaluating means, all in one, an SL synthesizing circuit 12 serving as synthesizing means for performing motion correction based on the output of the motion detecting/correcting circuit 11 and performing gradation correction with regard to the long exposure (LE) image and short exposure (SE) image based on the histogram calculated by the histogram calculating circuit 10 so as to synthesize one wide dynamic range image and store in the synthesized image buffer 16, correcting means thereof, gradation setting means, parameter changing means, region specifying means, and scene parameter holding means, all in one, and in image quality evaluating circuit 15 serving as image quality evaluating means for evaluating image quality of the wide dynamic range image by comparing the post-synthesizing wide dynamic range image stored in the synthesized image buffer 16 with a long exposure (LE) image and short exposure (SE) image stored in the LE-SE buffer 8 while making reference to the detection results of the motion detecting/correcting circuit 11, region evaluating means thereof, correcting means, dividing means, and partial evaluating means, all in one.

Also, the interface circuit 17 is configured having a key input circuit 18 serving as selection input means capable of setting regions or the like for performing weighting with the weight setting circuit 13 and capable of setting a recording format for the recording format selecting circuit 20, evaluation input means thereof, region specifying means, and scene selecting means, all in one, and the display circuit 19 serving as suitability display means for displaying the synthesized wide dynamic range image stored in the synthesized image buffer 16 while displaying suitability of the LS processing evaluated by the suitability evaluating circuit 14 and displaying image quality evaluated by the image quality evaluating circuit 15, candidate presenting means thereof, difficulty display means, unsuitability cause display means, evaluation display means, and scene presenting means, all in one.

The histogram calculating circuit 10 calculates a histogram indicating the frequency of manifestation of luminance levels, based on the luminance of each of the pixels making up a screen, or the luminance of pixels making up an edge within a screen.

In the event of calculating histograms using the former, the luminance signals themselves, gradation is distributed over a subject which has a relatively wide area, so when scenes wherein a person or the like which is the primary subject, for example, is taken in a wide background, a great number of gradations are distributed to the background.

Accordingly, the latter example takes note of the fact that primary subject such as a person or the like has more edges than background such as the sky, and extracts the edge components and calculates a histogram relating to the edge components.

An accumulated histogram is generated from the calculated histogram, and a tone curve is calculated for the gradation correction properties, and weighting that has been set by the weight setting circuit 13 is performed at the time of generating the accumulated histogram.

The weighting by the weight setting circuit 13 has means for estimating the primary subject by analyzing the image data and automatically executing, and means for the photographer to specify a region matching the primary subject with the key input circuit 18 and manually executing, with gradations being distributed with high priority to the region set by these.

As described above, the motion detecting/correcting circuit 11 uses the fact that a time difference occurs between taking the multiple images with differing exposures, the long exposure (LE) image and the short exposure (SE) image in this case, and detects positional offset within the images by obtaining the difference thereof, thereby detecting the motion there. Positional offset detected by difference include shifting of the entire image due to shaking of the camera or the like, partial offsetting within the image due to the subjects moving, and so forth.

Of these, with regard to the former, synthesizing can be performed following a calculating the shift direction and amount of shift, outputting the computation results thereof to the SL synthesizing circuit 12, and the SL synthesizing circuit 12 positioning the long exposure (LE) image and the short exposure (SE) image.

Also, with regard to movement due to motion of the subject, synthesizing by positioning is difficult, and particularly in the event that a static subject and a moving subject exist in the screen, or in the event that there is a subject moving in one direction and a subject moving in another direction, this is even more difficult, so information regarding the moving subject area is output to the suitability evaluating circuit 14 or image quality evaluating circuit 15, for displaying by the display circuit 19 as a destroyed portion regarding which SL processing cannot be performed.

The suitability evaluating circuit 14 analyzes the image data, and evaluates the degree to which the image quality can be improved by performing SL processing. That is to say, the suitability evaluating circuit 14 detects whiting-out and blacking-out within the screen based on the calculation results of the histogram calculating circuit 10, performs suitability evaluation according to the area thereof, and performs suitability evaluation according to the area of parts with movement in the screen, i.e., parts wherein there is offset between the long exposure (LE) image and short exposure (SE) image such that SL processing cannot be performed, based on output of the motion detecting/correcting circuit 11. The evaluation results by the suitability evaluating circuit 14 are displayed on a screen 30 of the display circuit 19, as an SL suitability display 31 in the form of a bar graph as shown in FIG. 2A, for example.

Figure 2A:
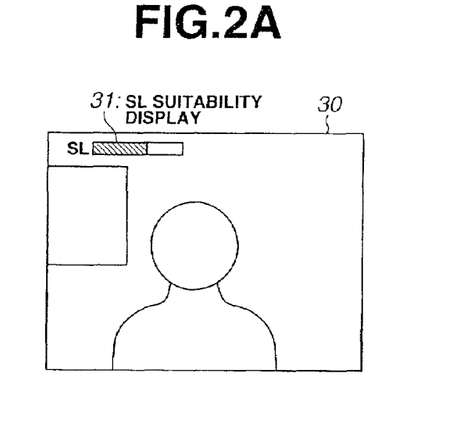
FIG. 2A, FIG. 2B, FIG. 2C, FIG. 2D, FIG. 2E, and FIG. 2F are diagrams illustrating a photography scene for a single backlighting portrait displayed on the screen of a display circuit in the above embodiment.
Figure 2B:
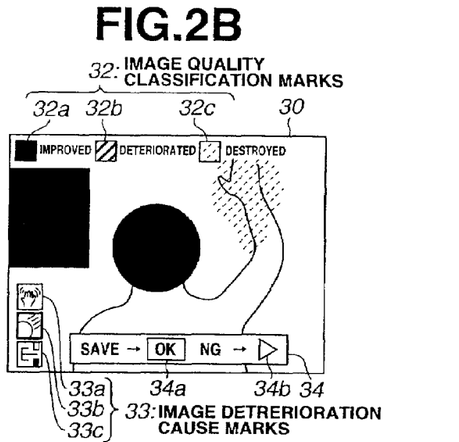

At the time of synthesizing the wide dynamic range image, the quality evaluating circuit 15 classifies the screen into portions wherein the image quality improves more than both of the image quality of the long exposure (LE) image and that of the short exposure (SE) image (portions with wider gradation widths), portions wherein the image quality deteriorates more than either of these (portions with narrower gradation widths), and destroyed portions wherein the images do not match due to the movement of the subject or the like, such that SL processing cannot be performed, evaluates these, and the evaluation results are displayed on the screen 30 of the display circuit 19 as image quality classification marks 32, as shown in FIG. 2B.

Next, FIG. 2A, FIG. 2B, FIG. 2C, FIG. 2D, FIG. 2E, and FIG. 2F are diagrams illustrating a photography scene for a single backlighting portrait displayed on the screen 30 of the display circuit 19.

First, FIG. 2A illustrates the way in which a display is made regarding what degree of SL processing is suitable for the photography scene, by the suitability evaluating circuit 14 evaluating the luminance distribution and the like of the image taken in from the CCD 4 upon a first release switch turning on synchronously with a release button being half-pressed (image from pre-photography), and outputting the results to the display circuit 19.

This photography scene shows a person being situated in approximately the middle of a room with a window to the left hand side of the screen, so that the scenery outside of the window has a relatively high luminance, and the head of the person standing with back to the window has a relatively low luminance.

Evaluation of what degree of improvement can be expected by performing SL processing on such a photography scene with a relatively great difference in luminance is displayed as, for example, a bar graph SL suitability display 31, so that the degree thereof can be readily recognized at a glance.

Next, FIG. 2B upon a second release switch turning on synchronously with the release button being full-pressed, the SL synthesizing circuit 12 processes the long exposure (LE) image and short exposure (SE) image taken in from the CCD 4 and generates the synthesized image, and the image quality evaluating circuit 15 compares the synthesized image with the images before synthesizing, evaluates which portions within the screen 30 have been improved/deteriorated/destroyed, and displays the destroyed portions along with the causes thereof.

First, the image quality classification marks 32 are displayed at the top of the screen 30 for example, with portions wherein the image quality has been improved by performing SL processing as indicated by the reference numeral 32a, the portions wherein the image quality has deteriorated as indicated by the reference numeral 32b, and the destroyed portions wherein SL processing itself cannot be performed as indicated by the reference numeral 32c. With this photography scene example, improvement in the image quality of the high-luminance portion outside of the window and the low-luminance portion at the head of the person is indicated, and further, the hand of the person which the person is waving is indicated as being a destroyed portion wherein the long exposure (LE) image and the short exposure (SE) image do not agree due to movement.

Also, image quality deterioration cause marks 33 relating to the destroyed portion are displayed at the lower left of the screen 30, and marks for indicating the cause are displayed as, for example, a shaking mark 33a, a subject moving mark 33b, and a whiting-out/blacking-out mark 33c. The mark showing the cause of these by which the image quality deteriorated and resulted in the destroyed portion is highlighted, and since the person is waving a hand here, the subject moving mark 33b is highlighted.

Further, a selection display windows 34 is provided below the screen 30, and a mark 34a for selecting to save the synthesized image thus evaluated, and a mark 34b for selecting cancellation of saving the image in this state, are displayed.

Figure 2C:
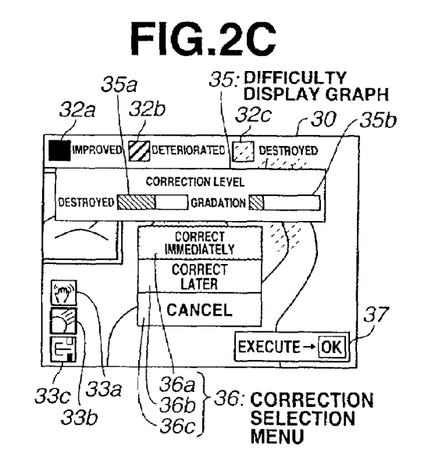

Next, FIG. 2C shows a difficulty display graph 35 and a correction selection menu 36 being displayed.

The difficulty display graph 35 is configured having a graph 35a indicating the difficulty of correcting the destroyed portion, and a graph 35b indicating the difficulty of optimizing gradation, displaying the difficulty of each as bar graphs in an intuitively understandable manner.

The difficulty of correcting the destroyed portion can be judged from that extent of offset of the images or the like in the event that the cause of the destroyed portion is shaking or moving of the subject, and can be judged from the area thereof in the event that the cause of the destroyed portion is whiting-out or blacking-out.

Also, the gradation optimizing difficulty can be judged based on the bimodal scale of the histogram or the like. In the event that a subject is localized at a particular gradation, for example, in the event of taking an image of a document wherein characters are printed on white paper with black ink, the luminance distribution will have two peaks localized at the luminance of the portion for the white paper and the luminance of the portion for the black ink, exhibiting bimodality. This is a somewhat extreme example wherein intermediate gradations do not exist, but gradation of optimization can be judged to be difficult in the event that the subject has such great bimodality as in this case.

Also, the correction selection menu 36 has a selection button 36a for immediately performing correction with the image pickup apparatus 1, a selection button 36b for performing correction with another device such as a personal computer or the like, for example, at a later time, and a selection button 36c for canceling selection of correction.

Further, an OK mark 37 for selecting highlighted items within the above correction selection menu 36 by operating a touch panel or operating a switch or the like at the time of execution, is displayed to the lower right of the screen 30.

Figure 2D:
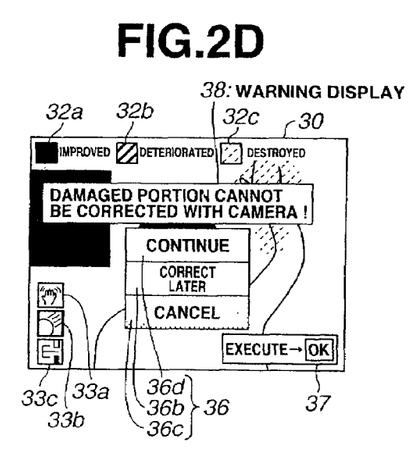

The following FIG. 2D illustrates a warning display 38 to the effect that correction by the image pickup apparatus 1 (listed as "camera" in the drawings) cannot be performed for the destroyed portion due to the destroyed portion existing in the screen, in the event that selection has been made in the screen in FIG. 2C to correct immediately with the image pickup apparatus 1.

The photographer can then, upon confirmation of this warning display 38, select to either continue on and perform correction (reference numeral 36d), correct with an external device (36b), or cancel (reference numeral 36c), from the correction selection menu 36.

Figure 2E:
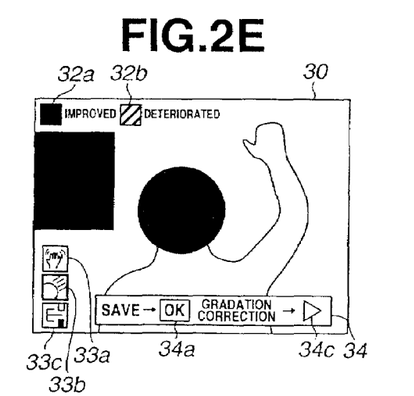

Next, FIG. 2E illustrates a post-correction image being displayed on the screen 30 of the display circuit 19, with only the improved portion indicated by reference numeral 32a and the deteriorated portion indicated by a reference numeral 32b being displayed. As for the destroyed portion, synthesizing is performed using either the long exposure (LE) image or the short exposure (SE) image, for example.

A mark 34a for selecting to save the image thus corrected and synthesized and a mark 34c for selecting further gradation correction are displayed in the selection display window 34, enabling selection thereof.

Figure 2F:
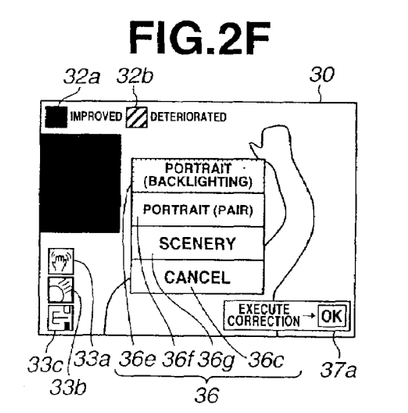

FIG. 2F illustrates a manual selection of a pattern for performing gradation correction from several typical photography scenes that are prepared beforehand, in the event that performing gradation correction is selected in the screen displayed in FIG. 2E.

Model scenes selectable as the correction selection menu 36 are backlighting portrait (reference numeral 36e), pair portrait (reference numeral 36f), and scenery (reference numeral 36g), in this case, and cancellation is also selectable as indicated by reference numeral 36c.

Also, a correction execution mark 37a for selecting highlighted items in the correction selection menu 36 by operating a touch panel or operating a switch or the like at the time of execution, is displayed at the lower right of the screen 30.

Now, the selections other than "scenery" have been classified into a backlighting portrait and a pair portrait, but may be classified into "single portrait", "pair portrait", and "backlighting".

Or, an arrangement may be made where an even greater number of model scenes are prepared beforehand, several model scenes estimated to match the photography scene are picked up by matching order, by image analysis within the image pickup apparatus 1, and these are displayed on the display circuit 19 as available selection options.

Figure 3A:
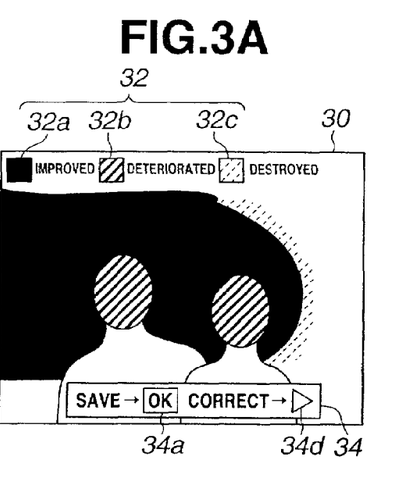
FIG. 3A, FIG. 3B, and FIG. 3C are diagrams illustrating a photography scene for a pair portrait displayed on the screen of the display circuit in the above embodiment.
Figure 3B:
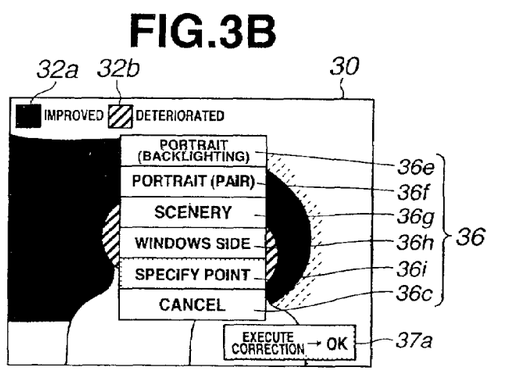
Figure 3C:
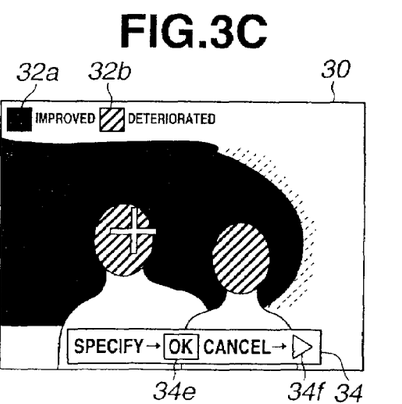

Next, FIG. 3A, FIG. 3B, and FIG. 3C are diagrams illustrating a photography scene for a pair portrait displayed on the screen 30 of the display circuit 19.

This photography scene shows two people side by side at approximately the center of the screen, with a night scene for the background for example, so that the background has relatively low luminance, and the heads of the two people which are illuminated by illumination light from a strobe or the like, have relatively suitable exposure.

FIG. 3A shows evaluation made by the image quality evaluating circuit 15 with regard to the synthesized image obtained by performing SL processing of such a photography scene. In this FIG. 3A, unlike the above FIG. 2B, there is no image quality deterioration cause mark 33 displayed, but this may be displayed, of course.

Then, the way in which the image quality of a great part of the background is improved, with a part destroyed, and the image quality of the heads of the people deteriorated, is shown.

Also, a mark 34a for selecting saving the synthesized image, and a mark 34d for selecting performing correction, are displayed in the selection display window 34.

Next, FIG. 3B corresponds to the above FIG. 2F, illustrating manually selecting a pattern for performing gradation correction from several typical photography scenes that have been prepared beforehand.

Model scenes selectable as the correction selection menu 36 are backlighting portrait (reference numeral 36e), pair portrait (reference numeral 36f), scenery (reference numeral 36g), and windowside (reference numeral 36h), in this case, and further, point specification (reference numeral 36i) for specifying portions where gradation is to be distributed with priority, and cancellation (reference numeral 36c), are also selectable.

FIG. 3C indicates the way in which a point is specified in the event that performing point specification (reference numeral 36i) is selected in the screen shown in FIG. 3B.

A pointer (shown as a cross-like shape in the figure) for pointing to a point to be specified is displayed in the screen, and in the event that gradation is to be distributed to the area which the pointer points to, the OK mark 34e of the selection display window 34 is confirmed, and on the other hand, in the event of canceling, the cancel mark 34f is confirmed.

Figure 4:
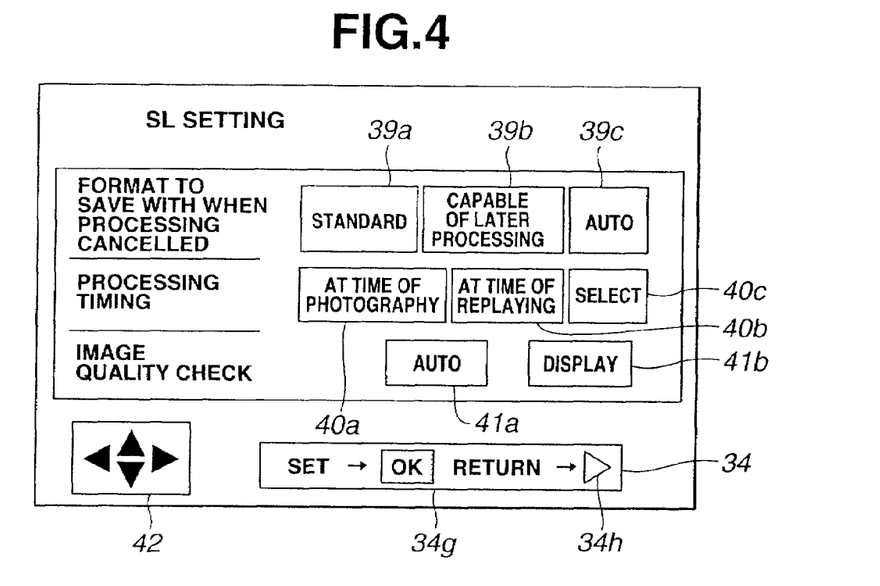
FIG. 4 is a diagram illustrating a setting screen relating to SL processing being displayed on the screen of the display circuit, in the above embodiment.

Also, FIG. 4 is a diagram illustrating the way in which a setting screen relating to SL processing is displayed on the screen 30 of the display circuit 19. The photographer can call up this setting screen at any time, to select items by a cross key 42, so that settings can be changed by the OK mark 34g, and the screen can be removed by the return mark 34h.

Selectable items to be set in SL processing are the three of: the saving format for recording with the recording circuit 21 in a situation wherein SL processing is to be canceled, processing timing indicating the timing for performing SL processing, and the image quality check method for the SL processing results.

First, as for the saving format, one can be set from "standard" (reference numeral 39a) for outputting a standard exposure image, "capable of later processing" (reference numeral 39b) for storing so that SL processing can be performed by external devices, and "automatic" (reference numeral 39c) for automatically selecting one of these.

Also, for processing timing, one can be set from "at time of photography" (reference numeral 40a) for execution at the time of full-pressing of the release button, "at time of reproducing" (reference numeral 40b) for execution at the time of displaying the image on the display circuit 19 following photography, and "select" (reference numeral 40c) for selecting processing timing.

In the event that, of these, at time of reproducing which is indicated by reference numeral 40b is selected at the time of reproducing, this is advantageous in that SL processing is not performed unnecessarily in cases wherein the photographer looks at the suitability evaluation and decides to record a standard exposure image (here, the long exposure (LE) image, for example), instead of the synthesized image.

Also, for image quality checking, either "automatic" (reference numeral 41a) for automatically judging the image quality from the processing results and deciding whether or not to save the synthesized image, or "manual" (reference numeral 41b) wherein the results are displayed and the judgment regarding whether or not to save the synthesized image is left up to the photographer.

Further, a selection display window 34 is displayed at the bottom of this SL setting screen 30, with the OK mark 34g having the above-described functions and the return mark 34h for returning to another screen displayed.

Figure 5:
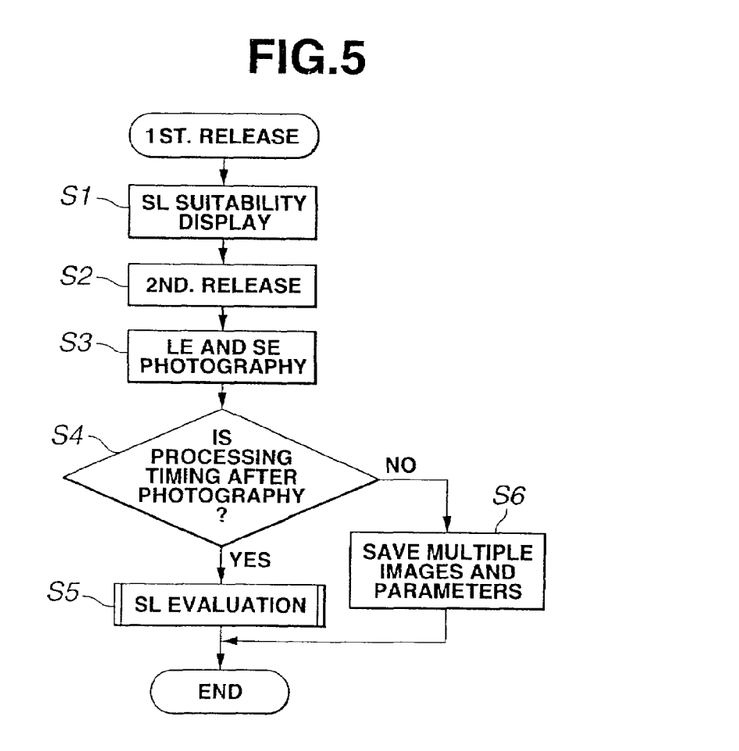
FIG. 5 is a flowchart illustrating operations upon the first release being performed with the image pickup apparatus according to the above embodiment.

FIG. 5 is a flowchart illustrating operations upon the first release being performed with the image pickup apparatus described above.

Upon the first release switch turning on, operating synchronously with a photographer half-pressing the release button, the CPU 6 detects this, and this operation is started.

First, the CCD 4 takes in a subject image from pre-photography, and determines a standard exposure amount by performing light measurement based on that image, and also the suitability evaluating circuit 14 evaluates whether or not this is a photography scene suitable for performing SL processing, and displays the evaluation results on the display circuit 19, as shown in FIG. 2A (step S1).

Next, the flow stands by until the release button is full-pressed, and upon the second release switch turning on synchronously with the full-pressing, the CPU 6 detects this (step S2).

Thus, a long exposure (LE) image equivalent to the standard exposure amount determined by the above light measurement is taken, and subsequently, a short exposure (SE) image of which the exposure amount is smaller than that of the long exposure (LE) image by a predetermined amount, is taken, and both images are digitized and stored in the LE-SE buffer 8 (step S3).

Subsequently, judgement is made whether or not the processing timing set in an SL setting screen as shown in FIG. 4 is after photography (step S4), and in the event that this is after photography, performs the later-described SL evaluation (step S5), and in other cases, saves multiple images (LE and SE) and parameters necessary for SL processing, so that SL processing will be possible when reproducing later. The parameters are the exposure time and so forth of each of the long exposure (LE) image and short exposure (SE) image (step S6).

Thus, this processing ends at the point that step S5 or step S6 ends.

Figure 6:
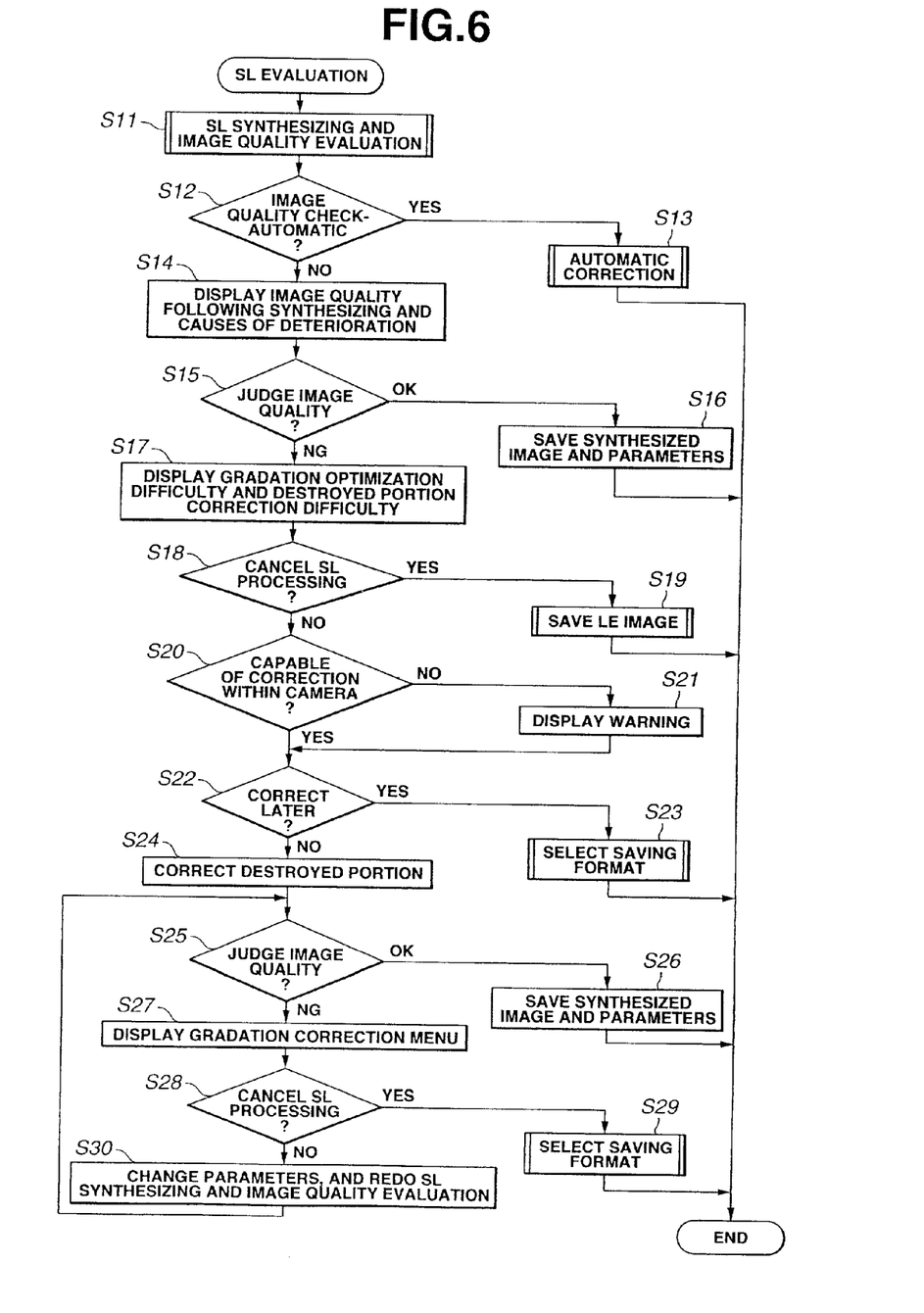
FIG. 6 is a flowchart illustrating the processing for SL evaluation in step S5 in the above FIG. 5.

FIG. 6 is a flowchart illustrating processing of SL evaluation in step S5 of FIG. 5.

Upon the start of the SL evaluation, the later-described SL synthesizing and image quality evaluation processing is performed (step S11). Then, whether or not the image quality check in the SL setting screen as shown in FIG. 4 is "automatic" is checked (step S12), and in the event that this is automatic, automatic correction processing as described later in detail is performed (step S13), and then the flow ends.

In all other cases, the image following SL synthesizing, the image quality evaluation of the image, and the deterioration cause of the destroyed portion, are displayed on the display circuit 19 as shown in FIG. 2B (step S14).

Then, which mark 34a or 34b, shown in FIG. 2B, the photographer has selected upon seeing the image quality of the post-synthesizing images, is detected from the output of the key input circuit 18 (step S15), and in the event that the mark 34a has been selected, the synthesized image and the parameters are saved in the recording medium or the like by the recording circuit 21 (step S16), following which the flow ends.

Also, in step S15, in the event that the mark 34b is selected, the gradation optimizing difficulty (reference numeral 35b) and destroyed portion correction difficulty (reference numeral 35a) and the correction selection menu 36 are displayed (step S17).

Then, whether or not the photographer has selected the selection button 36c to instruct cancellation of SL processing (step S18), and in the event that cancellation has been instructed, the standard exposure image (LE image) is saved (step S19).

In the event that SL processing is not cancelled in step S18, next, judgement is made regarding whether or not correction of the destroyed portion within the camera is difficult (step S20), and in the event that correction is difficult, a warning display is made to the effect that correction cannot be made, as shown in FIG. 2D (step S21).

In the event that judgement is made in step S20 that the destroyed portion can be corrected within the camera, or in the event that the processing in step S21 has ended, judgement is made regarding whether or not the photographer has selected the selection button 36b and selected not to immediately perform correction processing (step S22), and in the event that correction processing is not to be performed immediately, the later-described saving format selection is performed (step S23), and the flow ends.

On the other hand, in other cases in step S22, correction processing of the destroyed portion is performed (step S24) upon the understanding that the photographer has instructed immediately performing correction processing. This correction processing is performed for the destroyed portion which has been left a blank portion in the later-described SL synthesizing processing, using one of the data of the long exposure (LE) image and short exposure (SE) image, which is fit into the synthesized data while performing processing such as smoothing and the like so that there is no luminance difference and so forth with the surrounding regions.

After this correction processing ends, the correction results are displayed as shown in FIG. 2E, and which of the marks 34a or 34c the photographer has selected is detected from that output of the key input circuit 18 (step S25).

In the event that the mark 34a has been selected, the correction results and parameters are stored in a recording medium or the like by the recording circuit 21 upon the understanding that the photographer is satisfied with image quality (step S26), following which the flow ends.

On the other hand, in the event that the mark 34c has been selected, the correction selection menu 36 is displayed as shown in FIG. 2F upon the understanding that the photographer is not satisfied with the image quality of the correction results, so as to allow improvement in gradation correction, or for the photographer to instruct cancellation of the SL processing.

Then, judgement is made regarding whether or not the selection button 36c has been selected (step S28), and in the event that this has been selected, the later-described the saving format selection processing is performed (step S29), and the flow ends.

In the event that another selection button has been selected in step S28, the SL processing parameter settings are changed so as to correspond to the selected scene, and SL synthesizing processing is performed again (step S30). Here, parameters mean the weighting for each place in the image used for calculating the luminance histogram in the SL synthesizing processing, and are set by weighting corresponding to the selected scene being read out from the weight setting circuit 13.

Following the SL synthesizing processing having been redone, the results are displayed, and the flow returns to the screen in step S25 for waiting for image quality judgement (see FIG. 2E).

Figure 7:
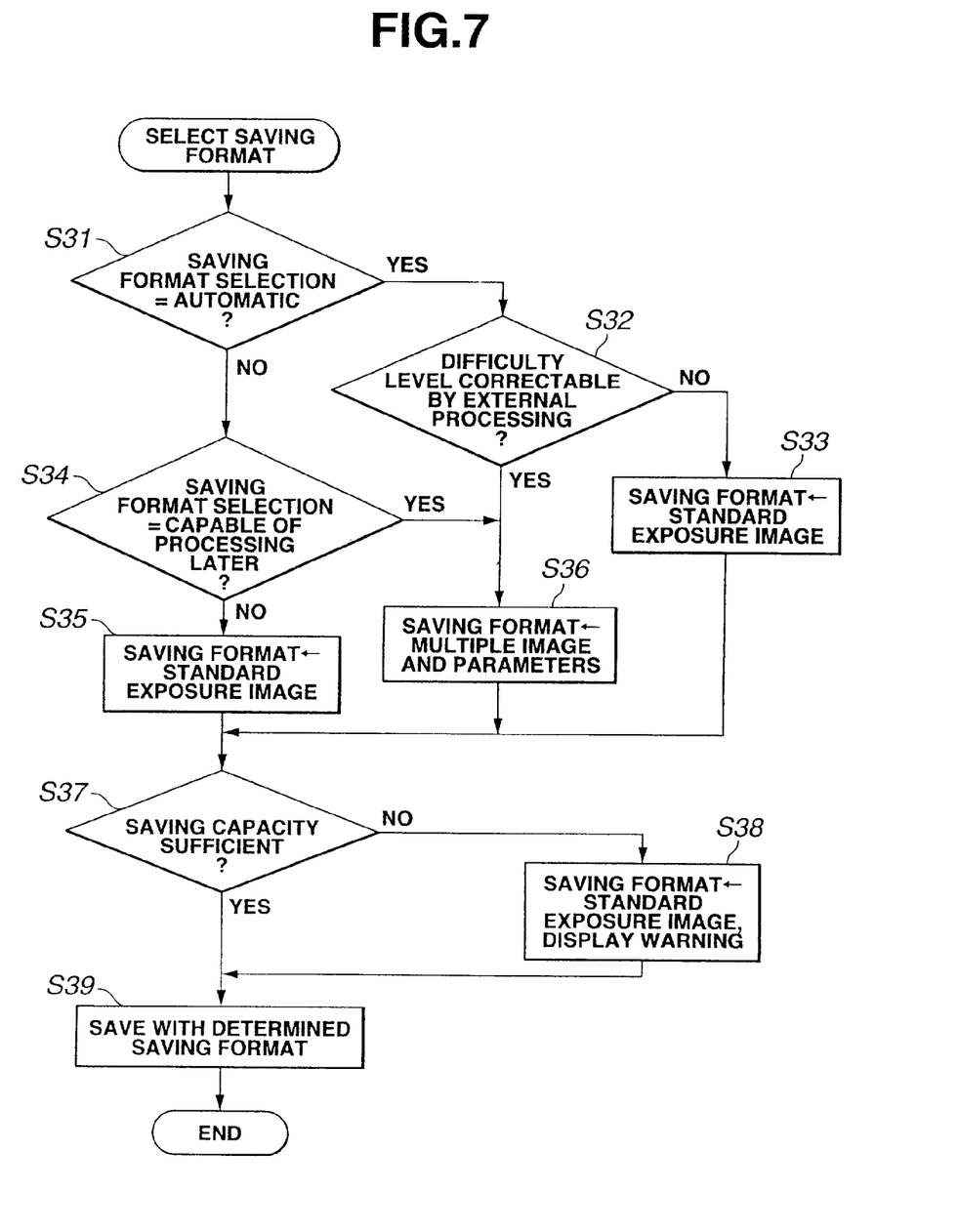
FIG. 7 is a flowchart illustrating the saving format selection processing performed in step S6 in the above FIG. 5 or in step S23 in the above FIG. 6.

FIG. 7 is a flowchart illustrating selection processing of the saving format performed in step S23 or step S29 of FIG. 6.

Upon the start of this processing, the saving format is selected according to the settings for the saving format in the SL setting screen as shown in FIG. 4.

First, judgement is made regarding whether or not "automatic" has been set for the selection state of the saving format (step S31), and in the event that "automatic" has been selected, the gradation correction difficulty and destroyed portion correction difficulty are compared with predetermined threshold values, and judgment is made regarding whether or not these are a level correctable by external processing (step S32).

Here, in the event that external processing cannot be done, a standard exposure image is selected as the saving format (step S33), and on the other hand, in the event that external processing can be made, a format made up of multiple images of the long exposure (LE) image and short exposure (SE) image, and parameters necessary for external SL processing, is selected as the saving format (step S36).

In step S31, in the event that "automatic" is not set for the saving format selection state, next, judgement is made regarding whether or not "capable of processing later" has been set (step S34), and in the event that "capable of processing later" has been set, the flow proceeds to step S36, and in the event that "capable of processing later" has not been set, a standard exposure image is set for the saving format (step S35).

Next, whether or not saving by the saving format set in step S33, step S35, or step S36, can be made is checked by whether or not there is sufficient saving capacity (step S37), and in the event that saving capacity is insufficient, the saving format is set to a standard exposure image, while giving a warning display such as "Capacity of recording medium is insufficient!", for example (step S38).

In step S37, in the event that confirmation is made that the saving capacity is sufficient, or upon the end of the processing in step S38, saving is performed with the saving format finally set (step S39), and the flow ends.

Figure 8:
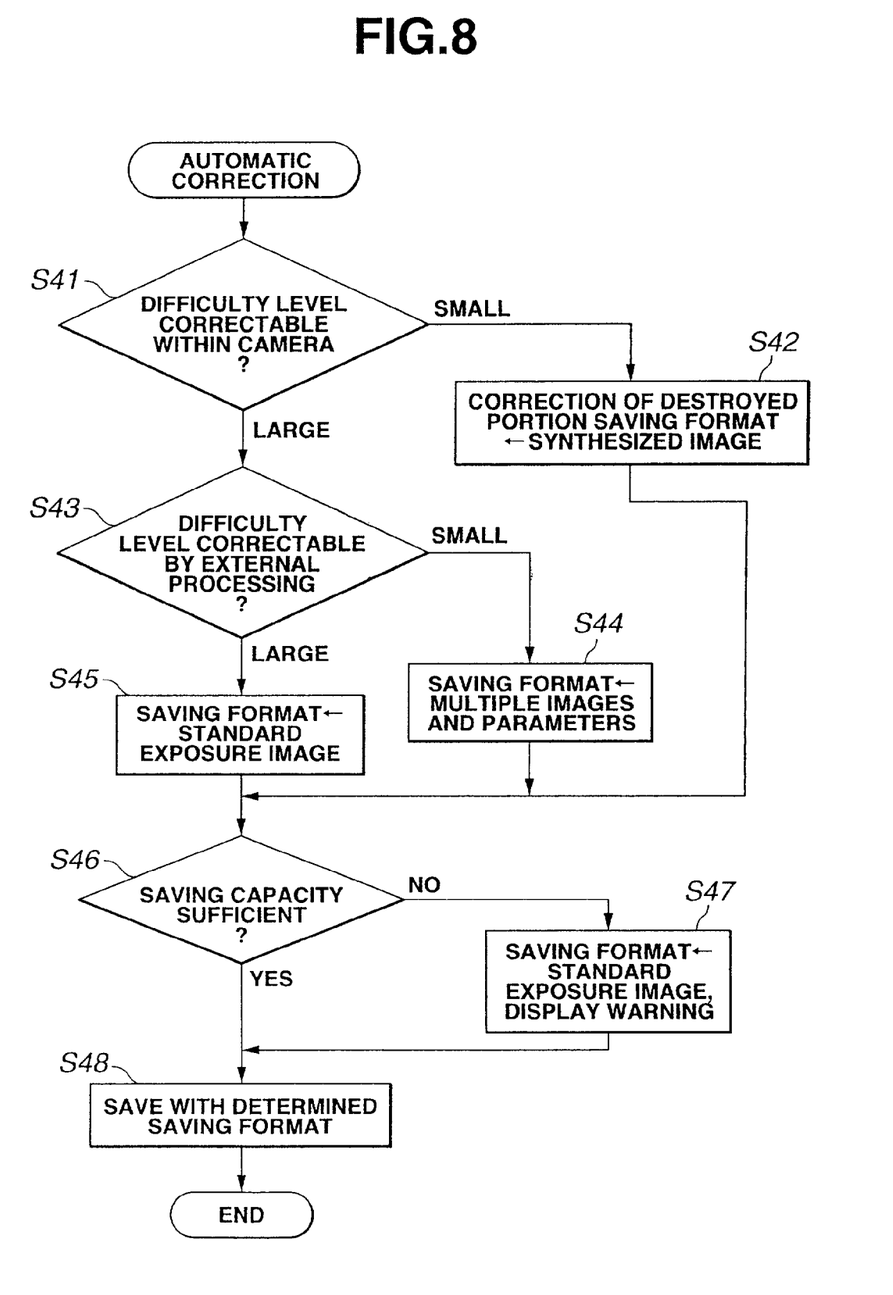
FIG. 8 is a flowchart illustrating the automatic correction processing performed in step S19 in the above FIG. 6.

FIG. 8 is a flowchart illustrating the automatic correction processing performed in step S13 shown in FIG. 6.

Upon the start of this processing, whether or not correction can be made within the image pickup apparatus 1 is judged by comparing the gradation correction difficulty and the destroyed portion correction difficulty with a predetermined first threshold value (step S41), and in the event that the difficulty is smaller than the first threshold value, the synthesized image is set as the saving format (step S42), and the flow proceeds to a later-described step S46.

Also, in the event that judgement is made in step S41 that correction processing cannot be made within the image pickup apparatus 1, next, the gradation correction difficulty and the destroyed portion correction difficulty are compared with a predetermined second threshold value (step S43) in order to judge whether or not external correction can be performed.

Here, in the event that the difficulty is smaller than the second threshold value, a format made up of multiple images of the long exposure (LE) image and short exposure (SE) image, and parameters necessary for external SL processing, is set (step S44) and the flow proceeds to a later-described step S46. On the other hand, in the event that judgement is made in that correction cannot be performed even externally, a standard exposure image is selected as the saving format (step S45).

Next, whether or not saving by the saving format set in step S42, step S44, or step S45, can be made is checked by whether or not there is sufficient saving capacity (step S46), and in the event that saving capacity is insufficient, the saving format is set to a standard exposure image, while giving a warning display such as "Capacity of recording medium is insufficient!", for example (step S47).

In step S46, in the event that confirmation is made that the saving capacity is sufficient, or upon the end of the processing in step S47 saving is performed with the saving format finally set (step S48), and the flow ends.

Figure 9:
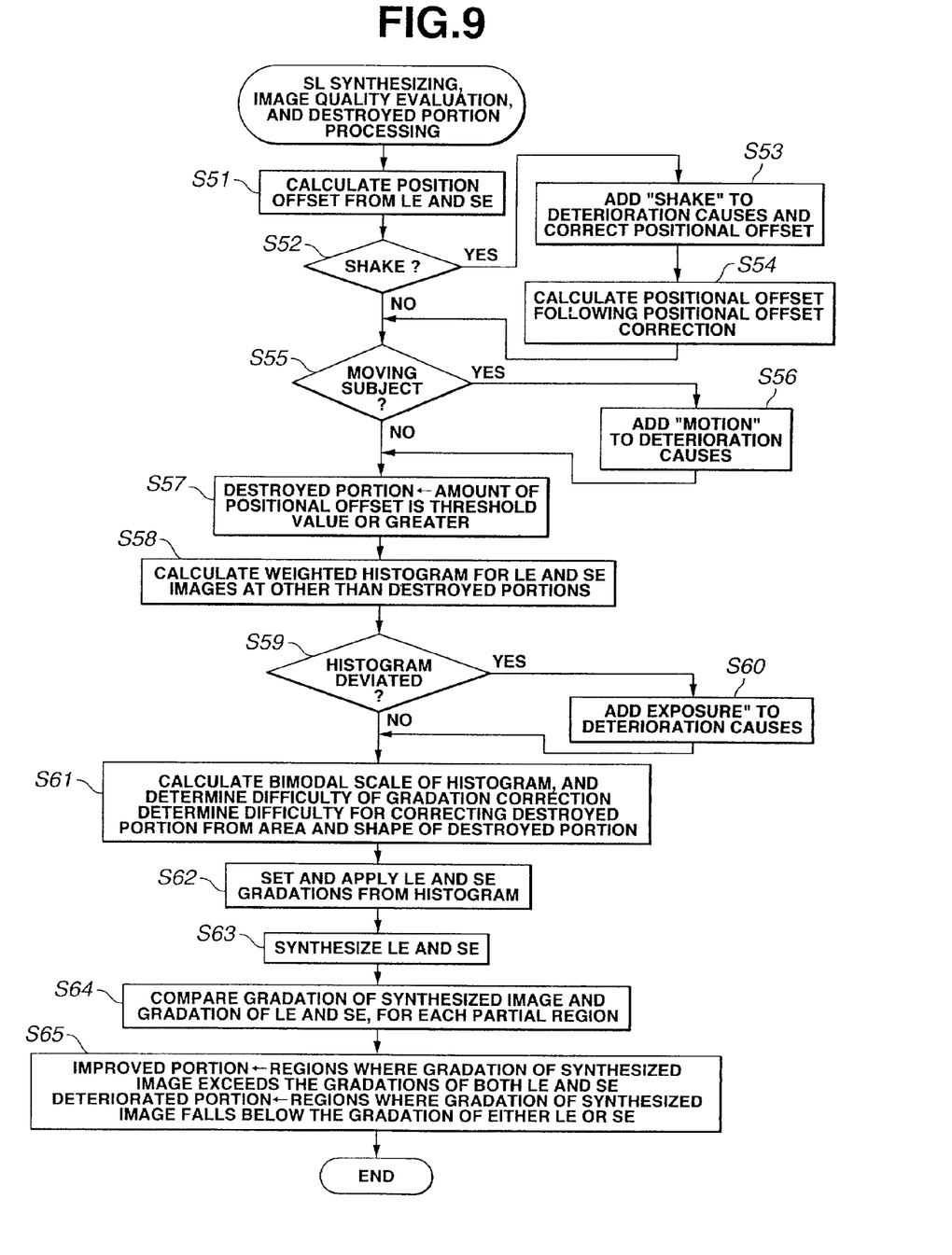
FIG. 9 is a flowchart illustrating the details of SL synthesizing and image quality evaluation processing performed in step S11 in the above FIG. 6.

FIG. 9 is a flowchart illustrating the details of SL synthesizing and image quality evaluation performed in step S11 shown in FIG. 6.

Upon the start of this processing, first, the motion detecting/correcting circuit 11 calculates the positional offset by taking the difference and the like between the long exposure (LE) image and short exposure (SE) image that had been taken with the time difference (step S51).

Then, judgement is made based on the calculation result, regarding to whether or not the positional offset is due to shaking (step S52), and in the event that this is due to shaking, "shaking" is added to the deterioration cause, and the positional offset is corrected by shifting the entire image (step S53).

Then, following correcting the positional offset due to shaking, positional offset still remaining within the image is calculated (step S54).

In the event that judgement is made in step S52 that there is no positional offset due to shaking, or in the event that the processing in step S54 has ended, next, judgement is made regarding to whether or not the positional offset is due to the subject itself moving (step S55), and in the event that this is due to the subject moving, "motion" is added to the deterioration cause (step S56).

In the event that judgement is made in step S55 that there is no positional offset due to moving of the subject, or in the event that step S56 has ended, portions wherein the amount of positional offset is or exceeds a predetermined threshold value are set as destroyed portions (see reference numeral 32c in FIG. 2B, etc.) (step S57). These destroyed portions are regions regarding which judgment is made that the positional offset is great, and accordingly a good synthesized image cannot be created with the image pickup apparatus 1 even by combining with the long exposure (LE) image and short exposure (SE) image.

Accordingly, weighted histograms are calculated for both the long exposure (LE) image and short exposure (SE) image, for the regions besides the destroyed portions (step S58).

Here, judgement is made regarding whether or not the deviation of the created histograms are great (step S59), and in the event that the deviation is greater than a predetermined value, "exposure" is added to the deterioration cause (step S60).

When this step S60 ends, or in the event that judgment is made in step S59 that the deviation is smaller than a predetermined value, the bimodal scale of luminance histogram representing the frequency of occurrence with regard to luminance, is calculated, the difficulty of gradation correction is determined based on the calculated bimodal scale (see reference number numeral 35b in FIG. 2C), and the difficulty of correcting the destroyed portions is determined based on the area and shape of the destroyed portions set in step S57 (see reference number numeral 35a in FIG. 2C) (step S61).

Next, a gradation conversion curve for performing gradation conversion for each of the long exposure (LE) image and short exposure (SE) image is calculated from the histogram, and gradation conversion is performed following the gradation conversion curves (step S62).

The long exposure (LE) image and short exposure (SE) image which have thus been subjected to gradation conversion are synthesized to generate a wide dynamic range image (step S63), and the gradation of the wide dynamic range image stored in the synthesized image buffer 16 is compared with the gradation of the long exposure (LE) image and short exposure (SE) image stored in the LE-SE buffer 8, for each partial region (step S64).

As a result of the comparison, partial regions wherein the gradation of the synthesized image exceeds the gradation of both the long exposure (LE) image and short exposure (SE) image are set as improved portions (see reference number numeral 32a in FIG. 2B, etc.), while partial regions wherein the gradation is below that of either one are set as deteriorated portions (see reference number numeral 32b in FIG. 2B, etc.) (step S65), and the flow ends.

According to such an embodiment, whether to take a synthesized image, a suitable exposure image, or multiple images with differing exposure before synthesizing, as the recording format of an image, can be selected automatically or manually, so SL processing can be performed by an external processing device as necessary.

Also, the arrangement displays SL suitability, thereby enabling whether or not the image quality will be improved by wide dynamic range processing to be predicted.

Also, the synthesized wide dynamic range image is compared with the long exposure (LE) image and short exposure (SE) image before synthesizing, and the improved portions and deteriorated portions are displayed, so which portions in the image gradations have been distributed to can be readily understood.

Further, destroyed portions wherein SL processing cannot be performed with the image pickup apparatus are displayed, so the photographer can make an adequate judgment regarding whether or not to cancel SL processing, or whether or not to perform SL processing with an external processing device.

Moreover, causes of deterioration in the image quality displayed, so the photographer can readily understand the causes.

Also, the difficulty of gradation correction and the difficulty of destroyed portion correction are displayed, so the photographer can make a more adequate judgment regarding whether or not to cancel SL processing, or whether or not to perform SL processing with an external processing device.

Further, in the event that destroyed portions exist in the image, a warning is made to the effect that corrections can not be performed with the image pickup apparatus, thereby preventing corrections being forcibly performed with the image pickup apparatus without noticing the destroyed portions.

Further, multiple models scenes are prepared beforehand so that one of the model scenes can be selected, so SL processing can be performed more easily than setting parameters manually.

Moreover, the timing for performing SL processing can be set, further improving usability.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus, comprising;
   image pickup means capable of taking a plurality of images with differing amounts of exposure light with respect to the same subject;
   synthesizing means for synthesizing the plurality of images with differing amounts of exposure light obtained from the image pickup means as a set of images, to thereby generate a synthesized image with a wide dynamic range;
   suitability evaluating means for evaluating the suitability of the synthesizing processing for the set of images;
   selecting means for selecting, based on the evaluation by the suitability evaluation means, one of (A) the synthesized image, (B) the set of images and (C) one image of the set of images; and recording means for recording the set of images and SL parameters when the set of images is selected by the selecting means, the SL parameters being used for generating the synthesized image with a wide dynamic range from the set of images in a predetermined external device of the image pickup apparatus.

2. An image pickup apparatus according to claim 1, wherein, in the event that the suitability evaluating means evaluate the suitability of the set of images for the synthesizing processing to be low, the selecting means select the set of images and the recording means record the set of images and the SL parameters.

3. An image pickup apparatus according to claim 2, wherein the suitability evaluating means are configured having suitability presenting means for presenting evaluation results of the suitability of the set of images.

4. An image pickup apparatus according to claim 1, wherein, in the event that the suitability evaluating means evaluate the suitability the synthesizing processing to be low, the selecting means select an image from the set of images that has been taken at a standard exposure amount, and the recording means record the image that has been taken at a standard exposure amount as selected by the selecting means.

5. An image pickup apparatus according to claim 1, wherein the selecting means select one of the set of images and the image included in the set of images that has been taken at a standard exposure amount based on the evaluation of the suitability evaluating means, and
the recording means record, in the event that the set of images is selected by the selecting means, the set of images and the SL parameters.

6. An image pickup apparatus according to claim 1, wherein said selecting means are configured having candidate presenting means for presenting images to be recorded and candidates for recording formats thereof, and selection input means for selecting candidates presented by said candidate presenting means, wherein the candidate selected by said selection input means is taken as the recording format.

7. An image pickup apparatus according to claim 1, wherein the suitability evaluating means are configured having unsuitable region extracting means for extracting unsuitable regions regarding which synthesizing processing with the synthesizing means become unsuitable based on the set of images, and correction difficulty evaluating means for estimating the difficulty of processing required in the event that correction is to be performed on synthesizing results with regard to the unsuitable image region, and the suitability of synthesizing processing is evaluated based on the difficulty evaluation by the correction difficulty evaluating means.

8. An image pickup apparatus according to claim 7, wherein the synthesizing means are configured having correcting means for performing correction with regard to the unsuitable image region;
wherein, in the event that the difficulty evaluation made by the correction difficulty evaluating means is a first threshold value or lower, the synthesizing means perform correction with the correcting means and generate a synthesized image, while the selecting means select the synthesized image;
wherein, in the event that the difficulty evaluation made by the correction difficulty evaluating means is a second threshold value or higher, the selecting means select an image from the set of images that has been taken at a standard exposure amount;
and wherein in other cases, the selecting means select the set of images.

9. An image pickup apparatus according to claim 7, wherein said correction difficulty evaluating means have difficulty display means for displaying difficulty evaluations.

10. An image pickup apparatus according to claim 7, wherein the unsuitable region extracting means are configured having motion detecting means for detecting the amount of positional offset between the images included in the set of images, with regions regarding which the detected positional offset amount is a predetermined threshold value or greater being extracted as unsuitable image regions; and
wherein the correction difficulty evaluating means evaluate difficulty based on the area and shape of the unsuitable image region.

11. An image pickup apparatus according to claim 1, wherein the suitability evaluating means are configured having cause detecting means for detecting causes which deteriorate the suitability of the synthesizing processing from the set of images, for evaluating the suitability of the synthesizing processing based on the detected results of the unsuitability cause detecting means.

12. An image pickup apparatus according to claim 11, wherein the unsuitability cause detecting means are configured having motion detecting means for detecting the amount off positional offset between the images included in the set of images, with the magnitude of the detected amount of positional offset being a cause which deteriorates the suitability of the synthesizing processing.

13. An image pickup apparatus according to claim 11, wherein the unsuitability cause detecting means are configured having exposure evaluating means for detecting blacking-out and whiting-out from the respective images included in the set of images, with the areas of the blacking-out and whiting-out being which deteriorates the suitability of the synthesizing processing.

14. An image pickup apparatus according to claim 11, wherein said suitability evaluating means are configured having unsuitability cause display means for displaying the detection results of said unsuitability cause detecting means.

15. An image pickup apparatus according to claim 1, wherein the suitability evaluating means are configured having image quality evaluating means for evaluating the image quality of the synthesized image based on the set of images and the synthesized image, with the suitability of the synthesizing processing being evaluated based on the image quality evaluation results of the image quality evaluating means.

16. An image pickup apparatus according to claim 15, wherein said image quality evaluating means are configured having region evaluating means for discerning between image regions wherein image quality is good and image regions wherein image quality is bad within said synthesized image, evaluation display means for displaying image regions wherein image quality is good and image regions wherein image quality is bad that have been obtained by said region evaluating means, and evaluation input means for accepting overall image quality judgment made based on the display by said evaluation display means.

17. An image pickup apparatus according to claim 16, wherein said image quality evaluating means are configured having correcting means for correcting image regions discerned as bad by said region evaluating means, with the correction results of said correcting means being evaluated and taken as new image evaluation results.

18. An image pickup apparatus according to claim 17, wherein said synthesizing means are configured having gradation setting means for holding parameters which stipulate to which region in the synthesized results that more gradations are to be appropriated;

and wherein said correcting means are configured having parameter changing means for changing the parameters of said gradation setting means, with synthesizing processing being performed by said synthesizing means following changing parameters by said parameter changing means, taking the synthesizing results as correction results.

19. An image pickup apparatus according to claim 18, wherein parameter changing means are configured having region specifying means for specifying the position of an image region to which gradations are to be appropriated to, with parameters being changed according to the specifications of said region specifying means.

20. An image pickup apparatus according to claim 18, wherein said parameter changing means are configured having scene presenting means for presenting candidates for a plurality of predetermined model scenes, scene parameter holding means for holding parameters for appropriating gradations to each of the plurality of modes scenes presented by said scene presenting means, and scene selecting means for accepting selection of candidates of said plurality of model scenes presented by said scene presenting means, with parameters corresponding to a model scene selected by said scene selecting means being read out from said scene parameter holding means and used by said gradation setting means.

21. An image pickup apparatus according to claim 20, wherein said scene presenting means contain at least the four types of "single portrait", "pair portrait", "scenery", and "backlighting".

22. An image pickup apparatus according to claim 16, wherein the region evaluating means are configured having motion detecting means for detecting the amount of positional offset between the images included in the set of images, with image regions wherein image quality is good and image regions wherein image quality is bad being discerned based on the positional offset detected by the motion detecting means.

23. An image pickup apparatus according to claim 16, wherein said region evaluating means are configured having dividing means for dividing an image into multiple regions, and partial evaluating means for judging whether the image quality of each of said plurality of regions is good or bad based on the dynamic range of the image within said plurality of regions, discerning image regions wherein image quality is good and image regions wherein image quality is bad based on the judgment of said partial evaluating means.

24. An image pickup apparatus, comprising:

image pickup means for sequentially taking a plurality of images with differing exposure amounts with a single image pickup device;

histogram calculating means for calculating histograms relating to luminance distribution within the screen of each of said plurality of images;

synthesizing means for generating synthesized images with expanded dynamic ranges, based on said plurality of images and said histogram;

motion detecting means for detecting moving portions of subjects between said plurality of images and the amount of motion thereof;

suitability evaluating means for evaluating whether or not there are problems with generating synthesized images with expanded dynamic ranges from said plurality of images;

image quality evaluating means for classifying said synthesized image into regions wherein image quality is improved more than any of said plurality of images, regions wherein image quality is deteriorated more than at least one of said plurality of images, and regions wherein image synthesizing cannot be performed, and performing evaluation thereby, based on said plurality of images and said synthesize image and moving portions of subjects and the amount of motion thereof; and display means for displaying said synthesized image and said trouble and said image quality evaluation results, based on the output of said suitability evaluating means and the output of said image quality evaluating means.

* * * * *